(12) United States Patent
Henderson et al.

(10) Patent No.: US 6,446,188 B1
(45) Date of Patent: Sep. 3, 2002

(54) CACHING DYNAMICALLY ALLOCATED OBJECTS

(75) Inventors: Alex E. Henderson, Hillsborough; Walter E. Croft, San Mateo, both of CA (US)

(73) Assignee: Fast-Chip, Inc., Sunnyvale, CA (US)

( * ) Notice: Subject to any disclaimer, the term of this patent is extended or adjusted under 35 U.S.C. 154(b) by 5 days.

(21) Appl. No.: 09/654,189

(22) Filed: Sep. 1, 2000

Related U.S. Application Data

(63) Continuation of application No. 09/203,995, filed on Dec. 1, 1998.
(60) Provisional application No. 60/152,680, filed on Sep. 7, 1999.

(51) Int. Cl.[7] .............................................. G06F 12/00
(52) U.S. Cl. ...................................... 711/206; 711/119
(58) Field of Search ................................ 711/119, 202, 711/206

(56) References Cited

U.S. PATENT DOCUMENTS

| | | | |
|---|---|---|---|
| 5,396,614 A | 3/1995 | Khalidi et al. | .............. 395/425 |
| 5,442,766 A | 8/1995 | Chu et al. | .................... 395/414 |
| 5,887,275 A | * 3/1999 | Nguyen et al. | ............. 707/100 |

FOREIGN PATENT DOCUMENTS

| | | |
|---|---|---|
| EP | 0 693 728 A1 | 1/1996 |

OTHER PUBLICATIONS

Hennessy, John L. and David A. Patterson. Computer Architecture: A Quantitative Approach. 1996. pp. 439–466.*

* cited by examiner

*Primary Examiner*—Kevin Verbrugge
(74) *Attorney, Agent, or Firm*—Fenwick & West LLP

(57) ABSTRACT

A system for mapping a sparsely populated virtual space of variable sized memory objects to a more densely populated physical address space of fixed size memory elements for use by a host processor comprises an object cache for caching frequently accessed memory elements and an object manager for managing the memory objects used by the host processor. The object manager may further comprise an address translation table for translating virtual space addresses for memory objects received from the host processor to physical space addresses for memory elements, and a management table for storing data associated with the memory objects used by the host processor.

60 Claims, 18 Drawing Sheets

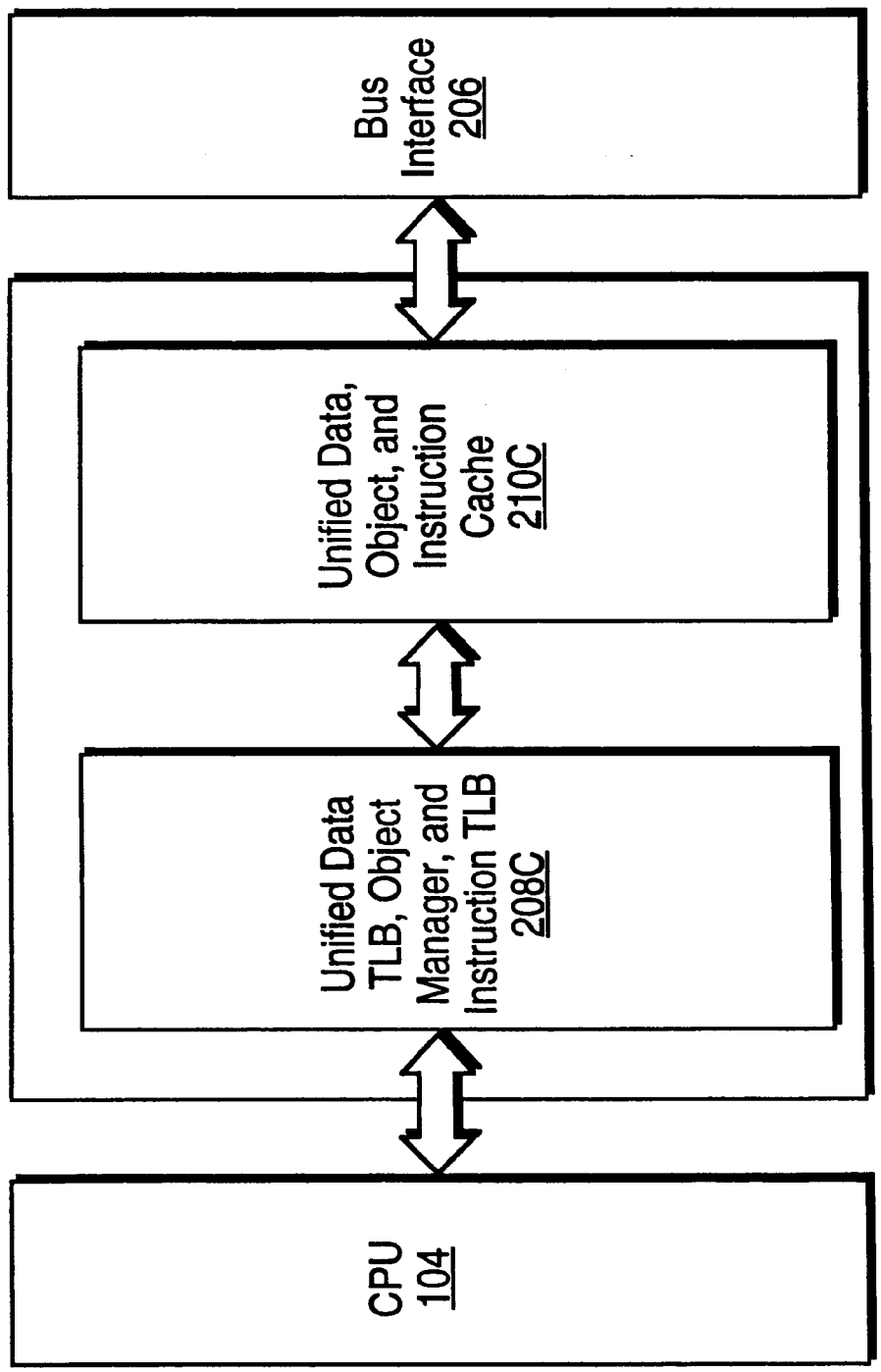

CACHING DYNAMICALLY ALLOCATED OBJECTS

RELATED APPLICATION

The subject matter of the present application is related to and claims priority, under 35U.S.C. §§120 and 119(e), from U.S. continuation patent application Ser. No. 09/203,995, entitled "Dynamic Memory Manager with Improved Housekeeping" by Alex E. Henderson and Walter E. Croft, which application was filed on Dec. 1, 1998 and is incorporated herein by reference in its entirety, and from U.S. provisional patent application serial No. 60/152,680, entitled "Dynamic Memory Caching" by Alex E. Henderson and Walter E. Croft, which application was filed on Sep. 7, 1999 and is incorporated herein by reference in its entirety.

BACKGROUND

A. Technical Field

The present invention relates generally to computer memory allocation and management, and more particularly to efficiently managing the dynamic allocation, access, and release of memory used in a computational environment.

B. Background of the Invention

Historically, memory used in a computational environment, such as a computer, has been expensive and of questionable reliability. The general belief was that this memory should be utilized or "packed" as fully as possible. Methods for the efficient (here used in the sense of utilized) use of memory became standard, and have not been seriously questioned before this invention, though attempts have been made to reduce the impact on performance of such usage, and to make the operations more deterministic.

U.S. Pat. No. 5,687,368 ("the '368 patent") teaches the conventional view of the methods for efficient memory implementation. The '368 patent addresses a major shortcoming of the prior art, which is loss of computational performance due to the need for memory management, also called housekeeping, to achieve efficient use of memory. The '368 patent teaches the use of a hardware implementation to alleviate the problem of loss of performance in the computational unit. However, the '368 patent does not teach reducing or eliminating housekeeping functions or mapping large, sparsely populated logical memory address space onto smaller, denser physical memory address space as in this invention. The '368 patent also does not teach making housekeeping functions more deterministic in the way or to the extent that the present invention does.

Traditional methods in the prior art, such as the '368 patent, copy data from memory location to memory location in order to compact and "garbage collect" the data. Garbage collection is a term used to describe the processes in a computer which recover previously used memory space when it is not longer in use. Garbage collection also consists of re-organizing memory to reduce the unused spaces created within the stored information when unused memory space is recovered, a condition known as fragmentation. The prior art inherently reduces the performance of the computational unit, due to the need to perform these operations and the time consumed thereby. Further, these operations are inherently not substantially deterministic, since the iterative steps required have no easily determinable limit in the number of iterations.

Basic assumptions in the prior art have been that memory should be optimized with respect to the utilization of the memory address space, rather than of the actual memory itself. Reliability was also considered to be a factor in utilizing available memory space as efficiently as possible. As a consequence, the atomic memory management data size was set in small blocks; usually 1024 bytes. Memory management systems (MMS) of the prior art then searched for memory not in use, often down to the individual block, so that memory space could be freed as expeditiously and to as small a unit size as possible.

The small size of the atomic memory unit often causes small pieces of memory, which are being used, to be interspersed with unused, or "garbage" locations, a process known as "fragmentation" of memory. Since this could result in significant problems in accessing streams of data due to the necessity to access small locations which are not contiguous, a technique known as "compaction" or "defragmentation" has been employed. This causes special commands and routines to be required and frequently used. In the UNIX operating system environment, when programming in ANSI C, for example. Function calls that directly or indirectly invoke these representative routines by allocating and releasing dynamic memory are known as "malloc( )", "calloc( )", "realloc( )", and "free( )". Again, these functions and the directly or indirectly invoked representative routines require a substantially indefinite number of iterations, and are substantially not deterministic.

Additionally, to aid the functions above and to better utilize available memory, various concepts such as "relocatable memory" were developed and implemented, thereby allowing for more efficient routines for memory management functions such as compaction and defragmentation. Memory management functions, using relocatable memory, work by copying memory atomic units (objects) from one location in memory to another, to allow garbage fragments between valid objects to be combined into larger free memory areas. However, while improving the flexibility of the allocation process, relocatable memory also requires indefinite numbers of iterations, and further makes the time required for housekeeping functions substantially not deterministic. Accordingly, it is desirable to provide a system and method for a dynamic memory manager to overcome these and other limitations in the prior art.

Additionally, prior art memory management systems require extensive memory resources. None of the memory management systems in the prior art employ a caching technique. Caching is a process that stores frequently accessed data and programs in high speed memory local (or internal) to a computer processing unit for improved access time resulting in enhanced system performance. Caching relies on "locality of reference," the statistical probability that if a computer is accessing one area of memory that future accesses will be to nearby addresses. A cache gains much of its performance advantage from the statistical probability that if a computer is accessing one part of an object that future accesses will be to other parts of the same object. Cache memories are classified by the type of association used to access the data (e.g. direct mapped, set associative, or fully associative), the replacement algorithm (e.g. Least Recently Used ("LRU") or Least Frequently Used ("LFU"), and the write algorithm (e.g. write back or write through). Cache memories are typically much smaller than the main system memory. The size of a cache memory, type of association, and access statistics of the program(s) executing determine the probability that a piece of data is in the cache when an access to that data occurs. This "hit rate" is a key determinant of system performance.

Accordingly it is desirable to provide a system and method for dynamic memory management technology in conjunction with caching techniques to reduce on chip memory requirements for dynamic memory management.

SUMMARY OF THE INVENTION

The present invention overcomes the deficiencies and limitations of the prior art with a novel system and method for dynamic memory management technology. A system for dynamic memory management maps a sparsely populated virtual address space of memory objects to a more densely populated physical address space of fixed size memory elements for use by a host processor. In one aspect, the system comprises an object cache for caching frequently accessed memory elements and an object manager for managing the memory objects used by the host processor. The object manager may further comprise an address translation table for translating virtual space addresses for a memory object received from the host processor to a physical space address for a memory element, and a management table for storing data associated with the memory objects and memory elements. In one embodiment, the address translation table and the management table are stored in the physical system memory. In another embodiment, the present invention further comprises an address translation table cache for caching the most recently or most frequently used address translation table entries. In yet another embodiment, the present invention further comprises a management table cache for caching the most recently or most frequently used management table entries.

In another aspect, a method for mapping a memory object used by a host processor to a memory element stored in physical memory comprises the steps of receiving a virtual space address for a memory object used by a host processor, determining a physical space address for the memory element or elements in the memory object, and retrieving the memory element from the physical system memory. In one embodiment, the present invention first checks the object cache to determine whether the memory element has been cached. If the memory element is in the object cache, it is an object cache "hit". If the memory element is not stored in the object cache, it is an object cache "miss", and the memory element is retrieved from physical system memory and stored in the cache according to the cache replacement logic.

These and other features and advantages of the present invention may be better understood by considering the following detailed description of preferred embodiments of the invention. In the course of this description, reference will be frequently made to the attached drawings.

BRIEF DESCRIPTION OF THE DRAWINGS

FIGS. 2A–2C are high level block diagrams of other embodiments of systems in accordance with the present invention.

DETAILED DESCRIPTION OF THE PREFERRED EMBODIMENTS

Figure 1:
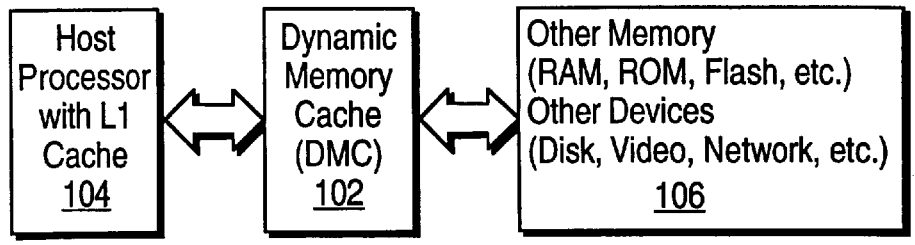
FIG. 1 is a high level block diagrams of one embodiment of a system in accordance with the present invention.

Referring now to FIG. 1, there is shown a block diagram of a system in accordance with the present invention. The present invention comprises a Dynamic Memory Cache ("DMC") 102 coupled to a host processor 104 and to other memory 106. In a preferred embodiment, the host processor 104 has a level 1 cache. The other memory 106 may comprise a RAM, ROM, Flash or other memory or may comprise other devices such as a disk, video, network, etc . . . The present invention provides a dynamically allocated memory object (not shown) for use by the host processor 104. The memory object comprises a plurality of memory elements or locations in other memory 106. The present invention maps the memory object used by the host processor 104 to a plurality of memory elements in the other memory 106. The memory elements are memory locations of fixed size in the other memory 106. For example, memory elements may be 16 bytes or they may be 64 bytes. The DMC 102 manages the memory objects used by the host processor 104 and performs the address translation functions between the host processor 104 and the other memory 106. Memory objects and memory object mappings are described in detail in copending application Ser. No. 09/203,995 entitled "Dynamic Memory Manager with Improved Housekeeping" by Walter E. Croft and Alex E. Henderson, which application was filed on Dec. 1, 1998, and which application is incorporated herein by reference in its entirety. Thus, the present invention advantageously allocates memory objects to the host processor 104 from a large sparsely populated virtual memory space and maps the allocated memory objects to a smaller densely populated physical memory space. This mapping provides the basis for the removal of dynamic memory housekeeping functions such as "garbage collection", de-fragmentation, and compaction.

Figure 2A:
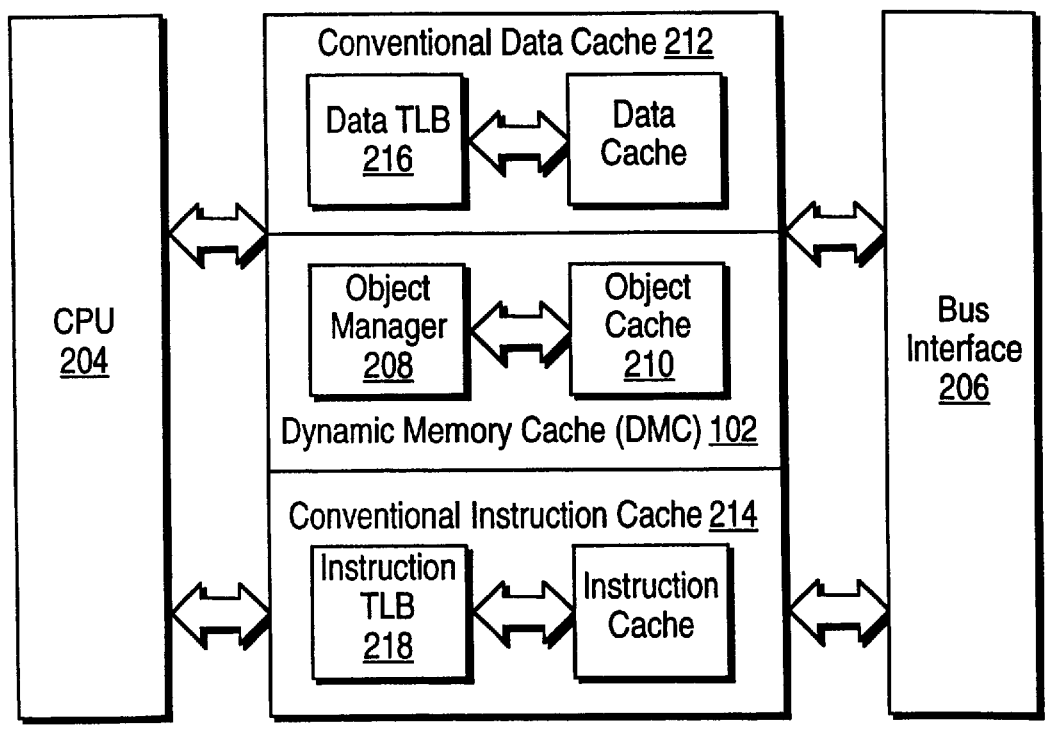
Figure 2B:
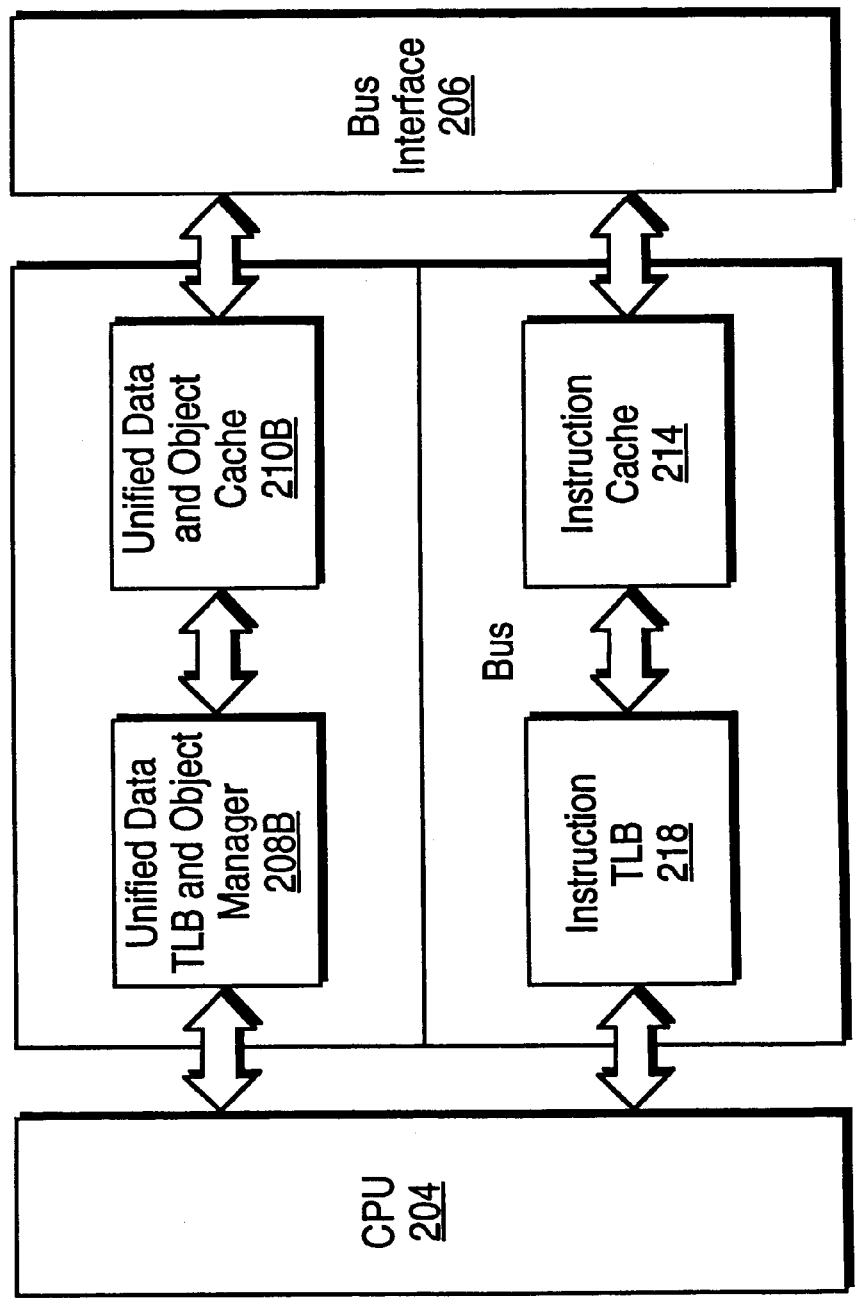

Referring now to FIG. 2, there is shown a high level block diagram of another embodiment of a system in accordance with the present invention. The present invention comprises a DMC 102 coupled to CPU or host processor 204 and to a bus interface 206 to a separate memory location. The DMC 102 further comprises an object manager 208 for allocation, de-allocation, and control of caching of the memory elements, and an object cache 210 for the storage of cached memory elements. FIG. 2A also shows a conventional data cache 212, conventional data Translation Lookaside Buffer (TLB), a conventional instructional cache 214, and instruction Translation Lookaside Buffer (TLB) to illustrate the high level similarities between the operation of the DMC with respect to the CPU 204 and the bus interface 206. FIGS. 2B and 2C illustrate various useful combinations of conventional TLB and caching with object management and object caching. These are analogous to conventional combined or "unified" instruction and data TLB and caches and offer the benefits of shared TLB tables and caches while maintaining the benefits of object management and object caching.

Figure 3A:
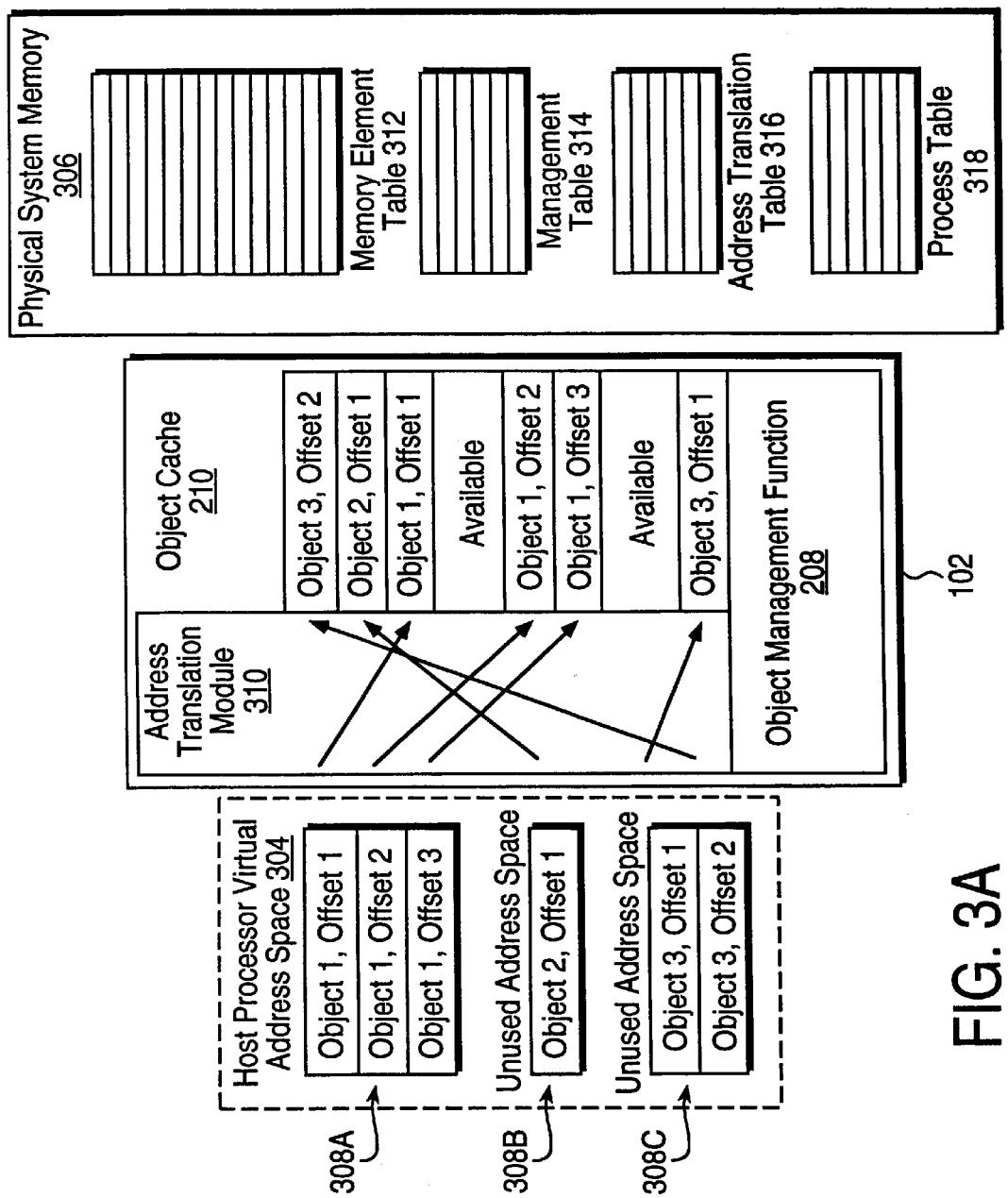
FIG. 3A is a dynamic memory mapping diagram in accordance with one embodiment of the present invention.

Referring now to FIG. 3A, there is shown a dynamic memory mapping diagram in accordance with one embodiment of the present invention. The present invention comprises a host processor virtual address space 304 for storing the memory objects 308A, 308B, and 308C, that are used by the CPU or host processor. Each memory object is mapped to one or more memory elements located in the physical system memory 306. For example, memory object 308A is mapped to three memory elements and memory object 308B is mapped to one memory element. The virtual space address of the memory object 308 used by the host processor is inputted to the DMC 102 for translation by the address translation module 310. The address translation module 310 translates virtual space addresses for memory objects 308 to physical space addresses for memory elements. In a preferred embodiment, the memory element is stored in the object cache 210 and can be accessed using the physical space address for the memory element. If the host processor accesses a memory element not found in the object cache 210, a miss will occur and the object manager 208 will replace entries in the management table, address translation table, and object cache to provide access to the desired object.

The DMC 102 maintains large software management and address translation tables in physical system memory 306. These large tables allow the management of very large numbers of objects. In one embodiment, physical system memory 306 maintains four data structures: a memory element table 312, a management table 314, an address translation table 316, and a process table 318. The memory element table 312 is a pool of small fixed sized memory areas ("memory elements") used to store data. These memory areas may or may not be sequentially located in memory. In one embodiment, these memory areas may be partitioned into multiple separate pools of memory elements allocated on a per process basis.

Management table 314 refers to a table or group of tables that store information about the size and address translation table entries of each allocated memory object. The management table 314 may be organized as an AVL tree, a hash table, a binary tree, a sorted table, or any other organizational structure that allows for rapid search and insertion and deletion of entries. In another embodiment, the most frequently used or most recently used management table entries are stored in a management table cache.

Address translation table 316 refers to a table or group of tables that store the virtual to physical address translation information for each memory element. In one embodiment, a single memory object will typically use several address translation table entries. In a preferred embodiment, the address translation table 316 may be organized as an AVL tree, a hash table, a binary tree, a sorted table, or any other organizational structure that allows for rapid search and insertion and deletion of entries. In another embodiment, the most frequently used or most recently used address translation table entries are stored in an address translation table cache.

The process table 318 refers to a table sorted by process, program, or thread ID that is used to locate the management table entries for memory objects associated with a particular process, program, or thread. In a preferred embodiment, this table is organized as an AVL tree to allow for rapid search and insertion and deletion of entries.

Figure 3B:
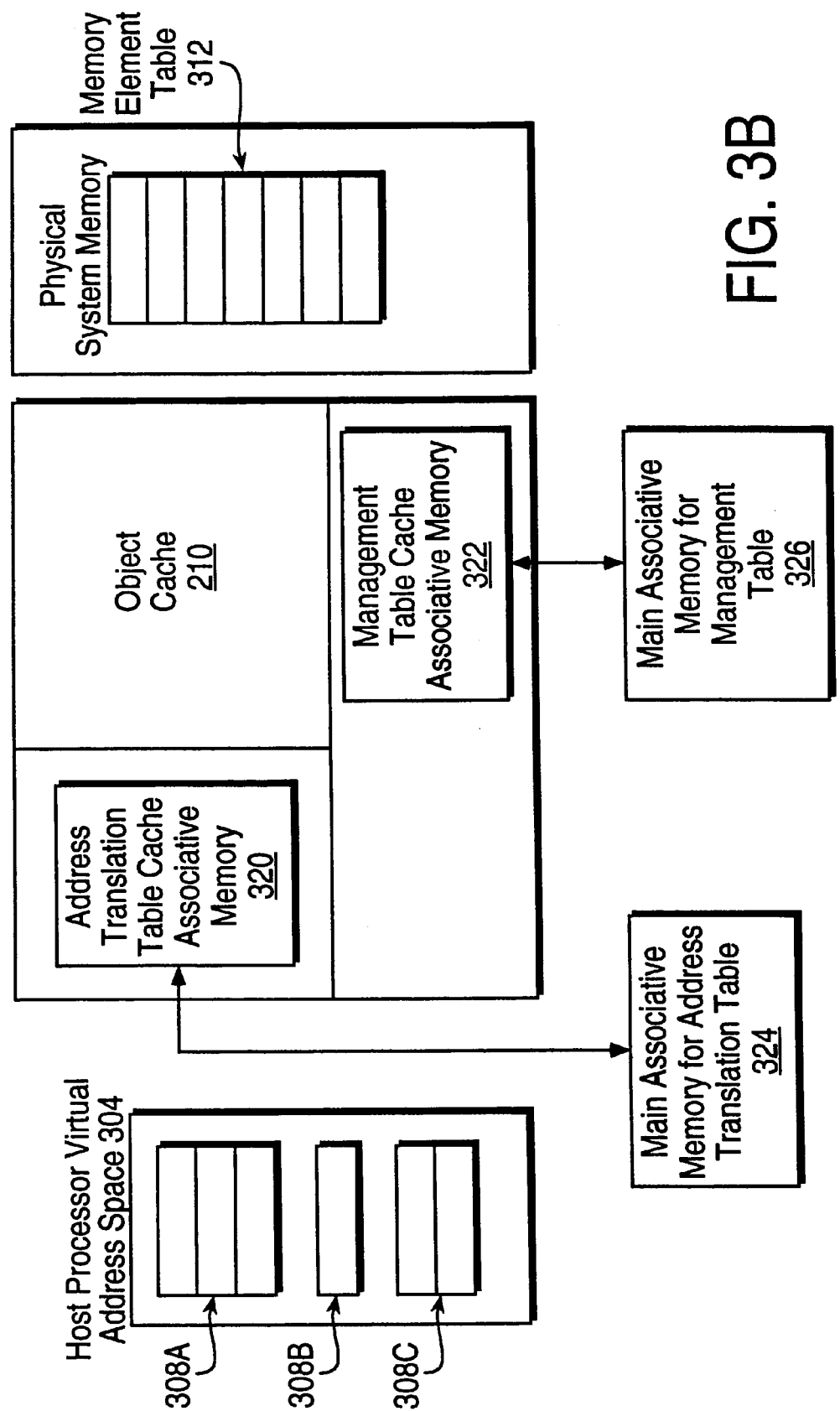
FIG. 3B is another embodiment of the present invention comprising caching associative memories.

Referring now to FIG. 3B, there is shown another embodiment of the present invention. The embodiment in FIG. 3B uses caching associative memories to implement the management table and the address translation table. Caching associative memories are described in more detail in copending U.S. patent application Ser. No. 09/636,305, entitled "Caching Associative Memories" by Alex E. Henderson and Walter E. Croft, which application was filed on Aug. 10, 2000 and which application is incorporated herein by reference in its entirety. More specifically, in this embodiment, the management table 326 is stored in a main associative memory and the address translation table 324 is stored in a main associative memory. The most frequently used or most recently used management table entries are stored in a management table associative memory cache 322. Similarly, the most frequently used or most recently used address translation table entries are stored in an address translation table associative memory cache 320. Associative memory caches have replacement logic to manage the replacement of cached data as explained in U.S. patent application Ser. No. 09/636,305.

In one embodiment, the present invention may be used in an operating system application. In a typical operating system application, there will be a large pool of object memory. The management table 314, address translation table 316, and process table 318 can be dynamically allocated supervisor or system privilege level objects. At system reset, the memory element table 312 would be initialized to contain three objects: management table 314, address translation table 316, and process table 318. The process table 318 will initially contain only one entry, the supervisor or system process entry. It may point to a management table that contains three entries, the process table, management table and address translation table entries. The address translation table may contain entries sufficient to define the physical address of these objects. A user process can request the allocation of a variable sized memory object from the operating system. The operating system, supervisor, or system process then dynamically allocates space for a new management table entry (an object belonging to the system process) and as address translation table entries (also belonging to the system process) as required to describe the requested object. The user process can then access the new memory object. Deallocation is the reverse process of deallocating the system objects used for the address translation and management table entries.

Figure 4:
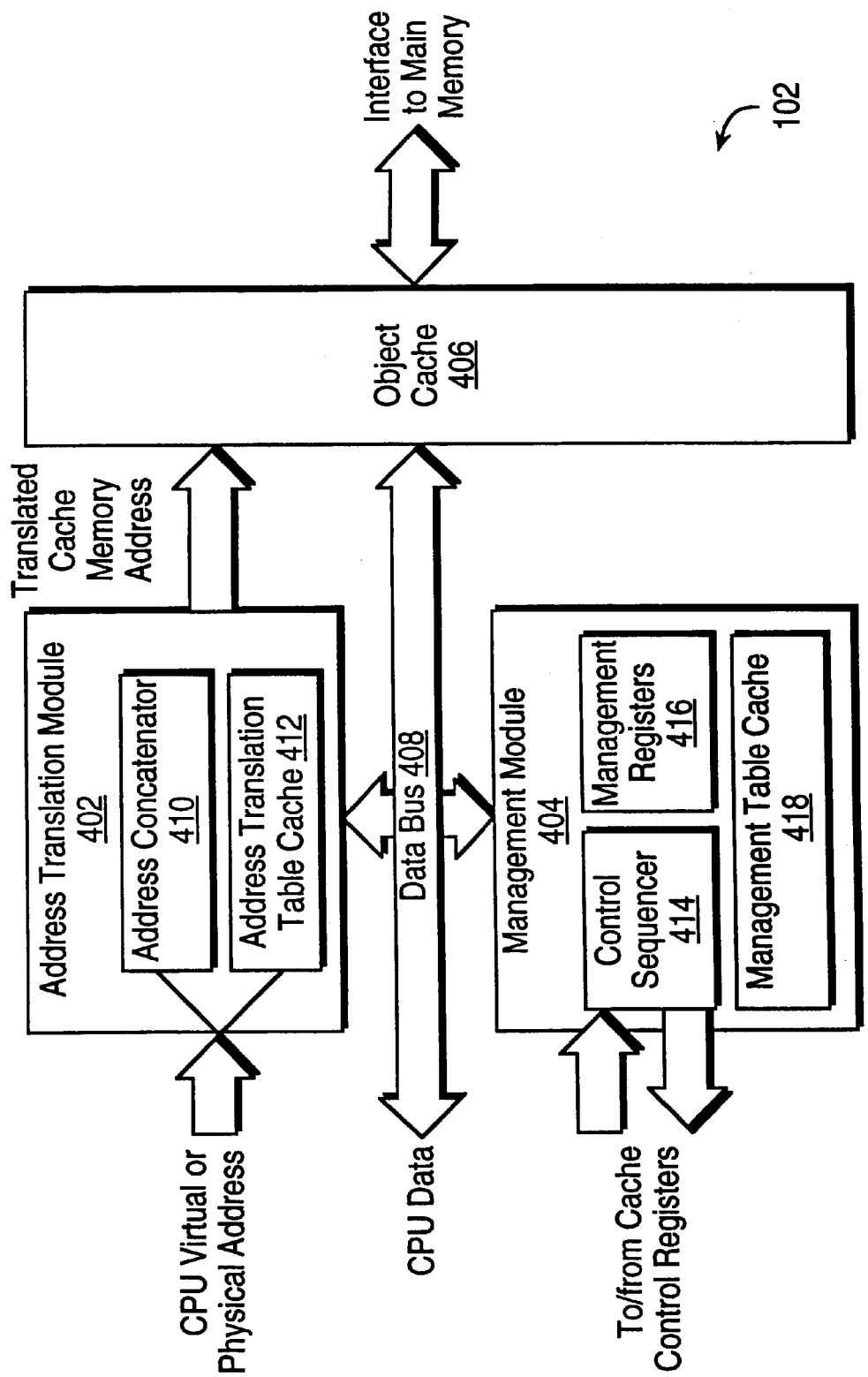
FIG. 4 is a block diagram of one embodiment of a Dynamic Memory Cache in accordance with the present invention.

Referring now to FIG. 4, there is shown a block diagram of one embodiment of a DMC 102 in accordance with the present invention. The DMC 102 comprises an address translation module 402, a management module 404, and an object cache 406. The address translation module 402 and management module 404 communicate directly with the CPU or host processor, and are coupled to the object cache 406 via data bus 408.

The management module 404 manages the object cache 406 and address translation module 402 for the DMC. The management module 404 preferably comprises a control sequencer 414, management registers 416, and a management table cache 418. Control sequencer 414 scans the CPU registers (not shown) for host processor commands, executes valid commands, and loads results for the host processor 104. Management table cache 418 contains an entry for each memory object active in the DMC 102.

The address translation module 402 translates the CPU virtual space address for a memory object to a physical memory space address for a memory element. The address translation module 402 comprises an address concatenator 410 and an address translation table cache 412. The address translation table cache 412 performs the content addressable memory ("CAM") lookup of object base address and object block index bits of the host processor virtual space address for the memory object, as described in more detail with reference to FIG. 14. If a valid cache entry exists for the physical address of the memory element, the address translation table cache 412 provides a cache address and physical memory address. The address translation table cache 412 contains memory element information comprising an object base address, which is known to the management table cache 418, an object block index, which is a secondary portion of the base address, a link to the next object base address/block index pair, a link back to the management table 418 entry for this object, an address of segment in cache, and an address of segment in system memory. The address concatenator 410 receives the address of the segment in cache from the address translation table cache 412. The address concatenator 410 also receives pass through low order bits of the host process address. The address concatenator 410 then concatenates the cache address and pass through low order bits and generates the cache memory address for the object cache 406.

The object cache 406 provides a fast local memory used to store frequently accessed memory element data. The cache replacement logic for object cache 406 selects the cache line or lines to be replaced in case of management table cache 418 or address translation table cache 412 misses. In a preferred embodiment, the object cache 406 uses a Least Recently Used ("LRU") replacement algorithm. The object cache 406 may include a write buffer to implement a delayed write of altered object data to other memory 106. The write may be a single word for write through caching or a complete object cache line buffer for write back caching. Write back and write through may be a selectable mode. In another embodiment, optional object cache coherency logic may be used for monitoring system bus writes by other devices to shared objects. The coherency logic may implement any of the classical bus snooping and cache coherency schemes.

Figure 5:
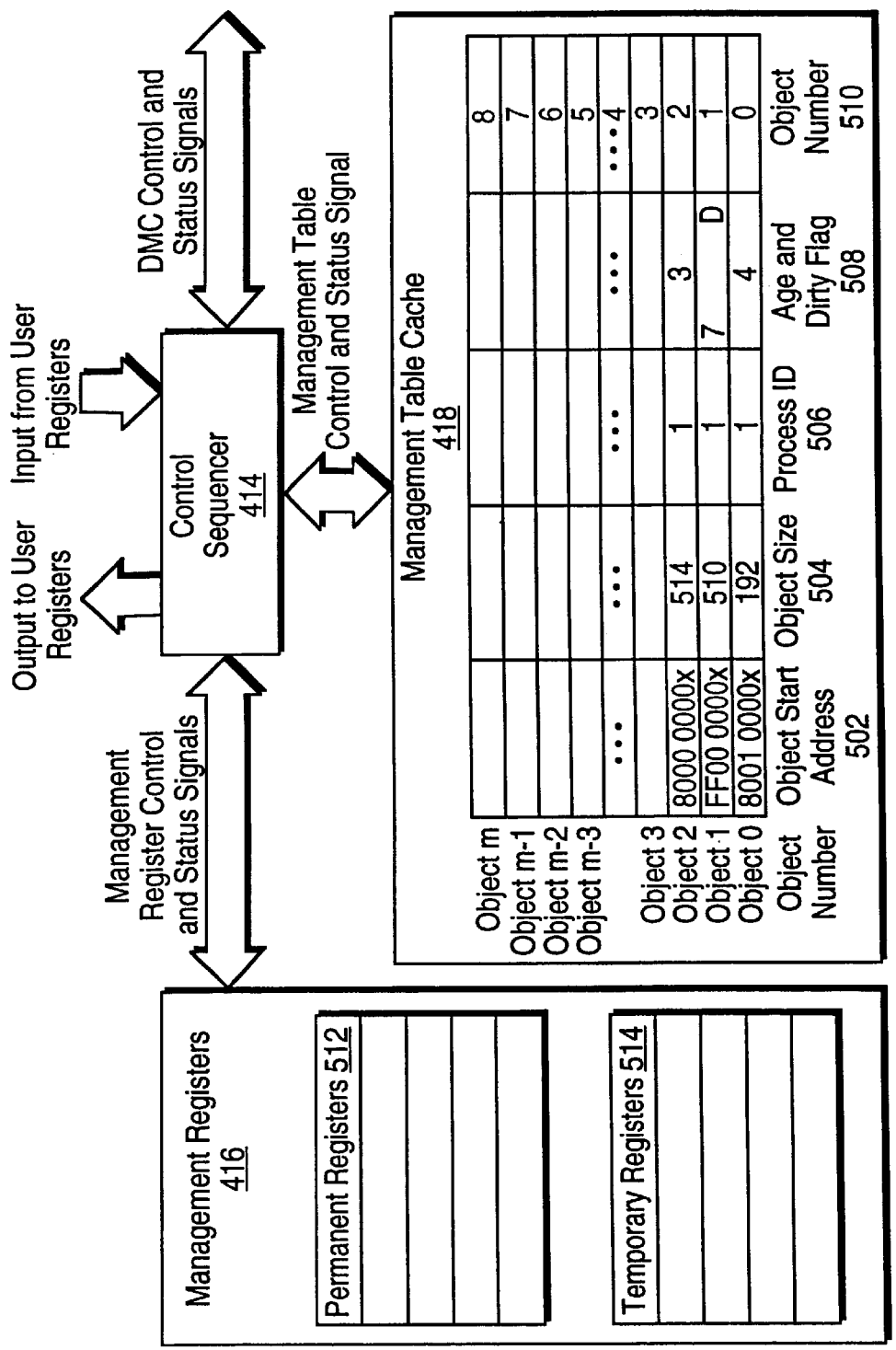
FIG. 5 is a block diagram illustrating additional details of the management module 404.

Referring now to FIG. 5, there is shown a block diagram illustrating additional details of the management module 404. Individual entries in the Management table cache 418 comprise an Object Start Address 502, Object Size 504, Process ID 506, Age and Dirty Flag 508, and Object Number 510. Management table cache 418 may also contain optional user and system data. In a preferred embodiment, a Least Recently Used ("LRU") algorithm is used to determine which management table cache 418 entry to replace. When an object is accessed that does not have a management table entry, the event is considered a "management table miss".

FIG. 5 also shows an example of three dynamically allocated memory objects of varying size added after DMC initialization. The object start address 502 and the object size 504 of the three memory objects define the location and extent of the memory objects in the virtual address space of the process specified by the process ID 506. Object number field 510 provides the index to the management table 314. In one embodiment, Age and Dirty Flag 508 and object number 510 are used to implement a LRU replacement algorithm. Preferably, all ages 508 are set to zero and dirty flags 508 are cleared by a system reset. When a new entry is added to the management table cache 418 the oldest entry (e.g. Age=0) is replaced. If more than one entry has an age of 0, the entry with the largest object number 510 is replaced. If the dirty flag 508 is set (for example, as a result of a re-alloc operation or a write to the object) the replaced entry is written back to other memory 106.

Management registers 416 provide working data for the DMC. These registers contain information about the address translation module 402 and the management module 404. The management registers 416 contain results of host processor commands that are returned to the host via the user registers. Management registers 416 comprise a set of permanent registers 512 and temporary registers 514. The permanent registers 512 contain information such as the maximum size of a memory object, the number of free entries in the management table cache 418, a pointer to the next free entry in the management table cache 418, the number of free entries in the address translation table cache 412, and a pointer to the next free entry in the address translation table cache 412. Preferably, the permanent registers 512 are initialized at power on and reset. Temporary registers 514 contain information such as the memory size requested, the calculated number of address translation table cache entries, and pointers, counters, etc . . .

The control sequencer 414 is the processing core of the DMC 102 and utilizes control and status signals to access each section of the DMC via the internal data bus 408. The control sequencer 414 comprises at least five different control sequences: 1) main loop, 2) initialize process, 3) allocate process, 4) release process, and 5) diagnostic process. The main loop process of the control sequencer 414 executes the initialize process on power up or reset, monitors the user device control register (not shown) for commands, dispatches the command for execution, and makes available the results of the command to the host processor. The initialize process sets the DMC and associated private memory to a known state. The allocate process verifies that the dynamic memory allocation is valid and claims resources, adds memory objects, and updates status. The release process verifies that the dynamic memory release is valid and frees resources, removes memory objects, and updates status. The diagnostic process reads or writes a specified DMC data element.

Figure 6:
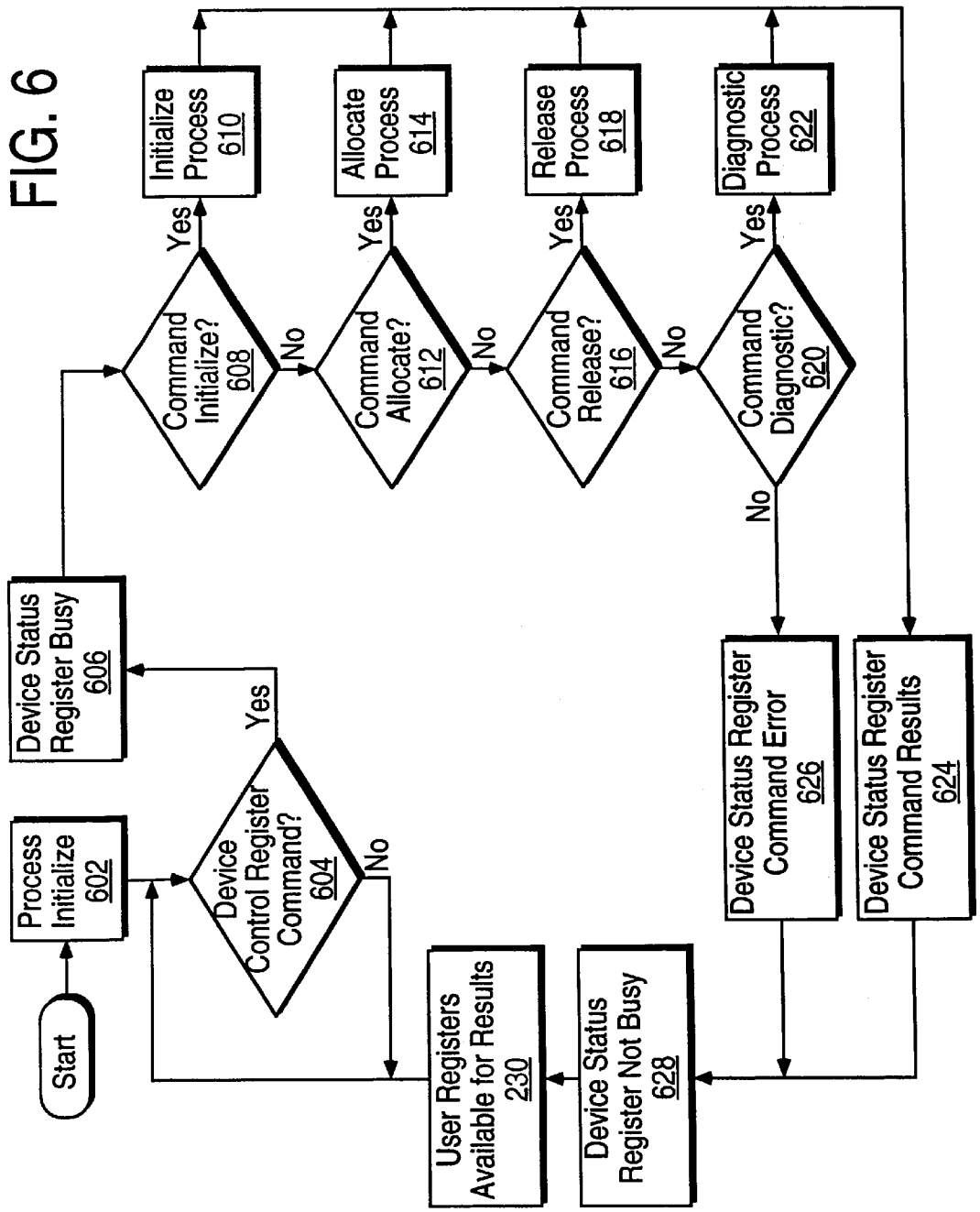
FIG. 6 is a flow chart of one embodiment of the main loop process for the control sequencer 414.

Referring now to FIG. 6, there is shown a flow chart of one embodiment of the main loop process for the control sequencer 414. This process is started by a system reset. After the system reset, the initialize process initializes the DMC. After initialization is complete, the control sequencer pools the device control register for a command. When a command is detected, the busy indication is set in the device status register 606. The command is decoded to determine which sub process should run. If no valid command is found, the command error bit in the device status register is set 626, otherwise the command results bits in the device status register are set 624 on sub process completion. The busy indication in the device status register is then cleared 628 and the contents of the user registers are available 230 to the CPU.

Figure 7:
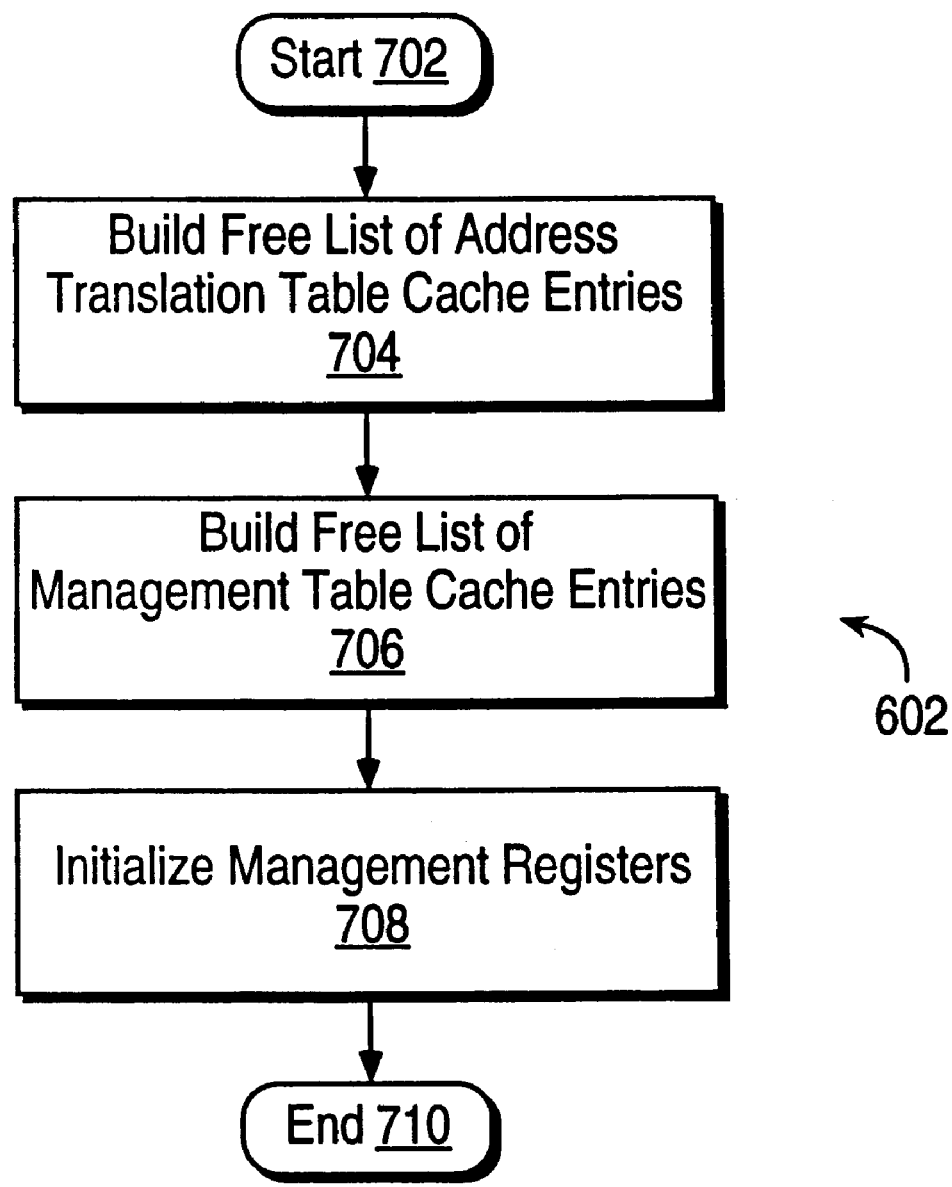
FIG. 7 is a flow chart of one embodiment of the initialize process for the control sequencer 414.

Referring now to FIG. 7, there is shown a flow chart of one embodiment of the initialize process for the control sequencer 414. The process starts at 702 and builds a free list of address translation table cache entries 704. The process then builds a free list of management table cache entries 706. Next, the process initializes the management registers 708 and ends at 710.

Figure 8:
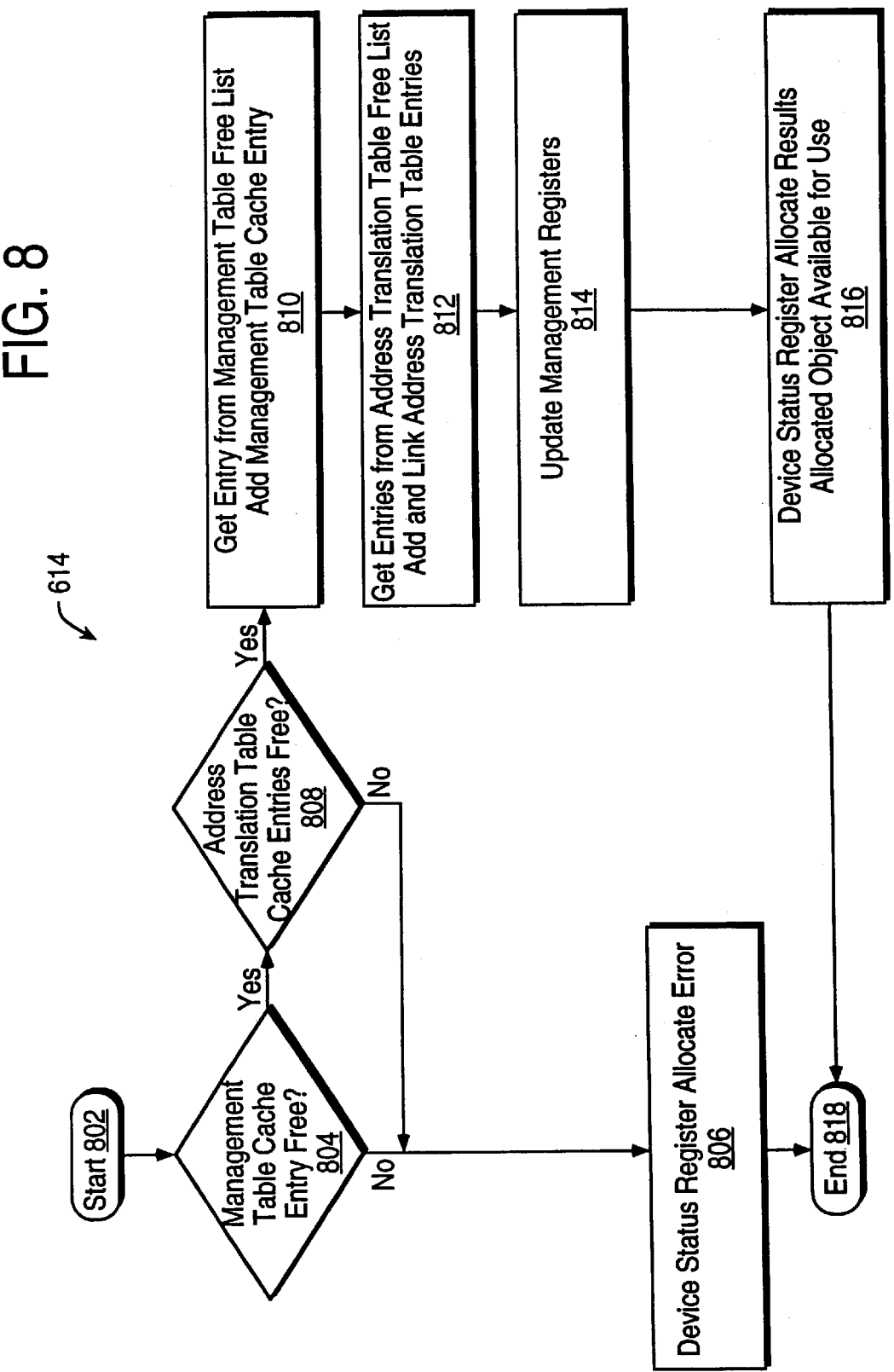
FIG. 8 is a flow chart of one embodiment of the allocate process for the control sequencer 414.

Referring now to FIG. 8, there is shown a flow chart of one embodiment of the allocate process for the control sequencer 414. The process starts at 802 and determines 804 whether a management table cache entry is free. If an entry is not free, the device status register is set to indicate allocate an error 806 and the process ends 818. If an entry is free, the process then determines 808 whether an address translation table cache entry is free. If an entry is not free, the device status register is set to indicate an allocate error 806 and the process ends 818. If an entry is free, the process gets an entry from the management table cache free list and adds the management table cache entry 810. The process then gets entries from the address translation table cache free list and adds and links address translation table cache entries 812. The process then updates 814 the management registers. Finally, results of the allocate are stored in the device status register and the allocated object is available for use 816.

Figure 9:
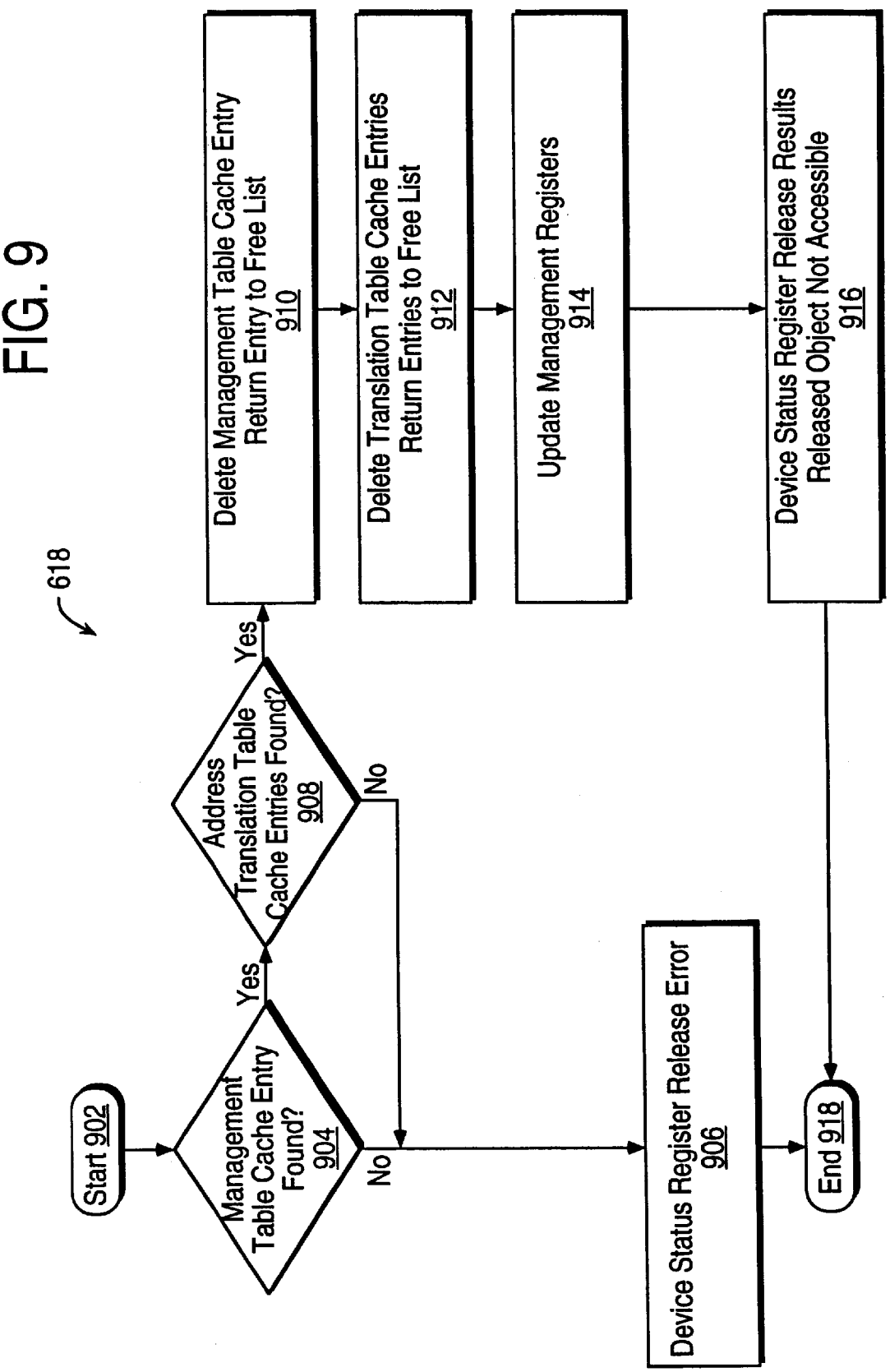
FIG. 9 is a flow chart of one embodiment for a release process for the control sequencer 414.

Referring now to FIG. 9, there is shown a flow chart of one embodiment for a release process for the control sequencer 414. The process starts at 902 and determines 904 whether the management table cache entry has been found. If the answer is no, the device status register indicates a "release error" 906 and ends at 918. If the management table cache entry is found, the process then determines 908 whether the address translation table cache entries can be found. If the answer is no, the device status register indicates a "release error" 906 and the process ends 918. If the answer is yes, the process deletes the management table cache entry and returns the entry to the management table free list 910. The process then deletes the address translation table entries and returns the entries to the address translation table free list 912. Afterwards, the process updates 914 the management registers. The device status register then indicates 916 the release results and indicates that the released object is not accessible.

Figure 10:
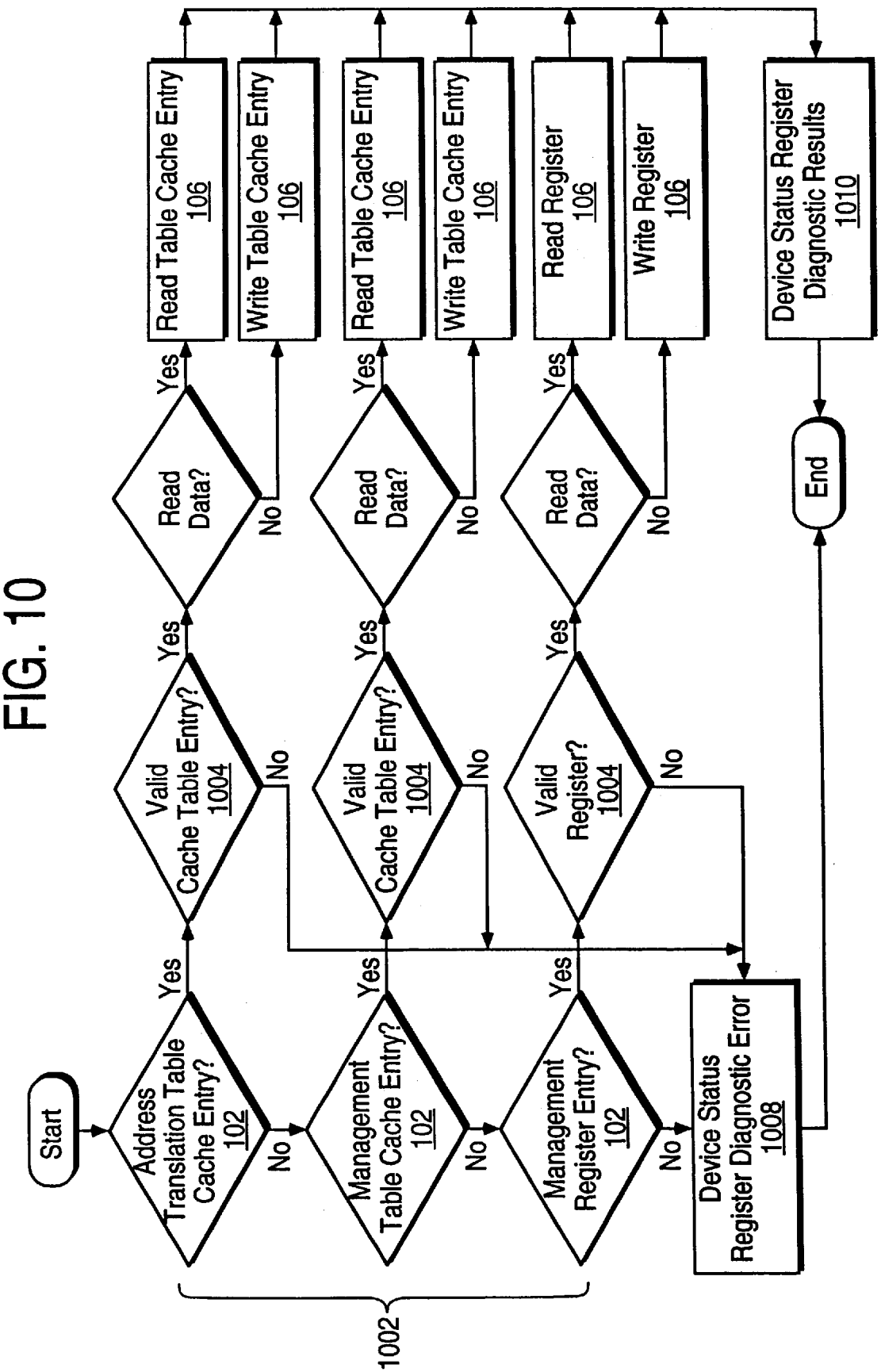
FIG. 10 is a flow chart of one embodiment of the diagnostic process of the control sequencer 414.

Referring now to FIG. 10, there is shown a flow chart of one embodiment of the diagnostic process of the control sequencer 414. The diagnostic process provides software access to the internal data structures of the DMC for software diagnostics. Sub commands are provided to read and write the Address Translation Table cache 412, Management Table cache 418, and Management Registers 416. These commands are decoded by decisions 1002. The parameters for these commands are validated by the decisions 1004. If either a bad sub command or invalid parameter is detected the diagnostic error indication in the device status register is set. If the sub command and parameters are valid, the read or write function 1006 is executed and the read or write result set in the device status register is set 1010.

Figure 11:
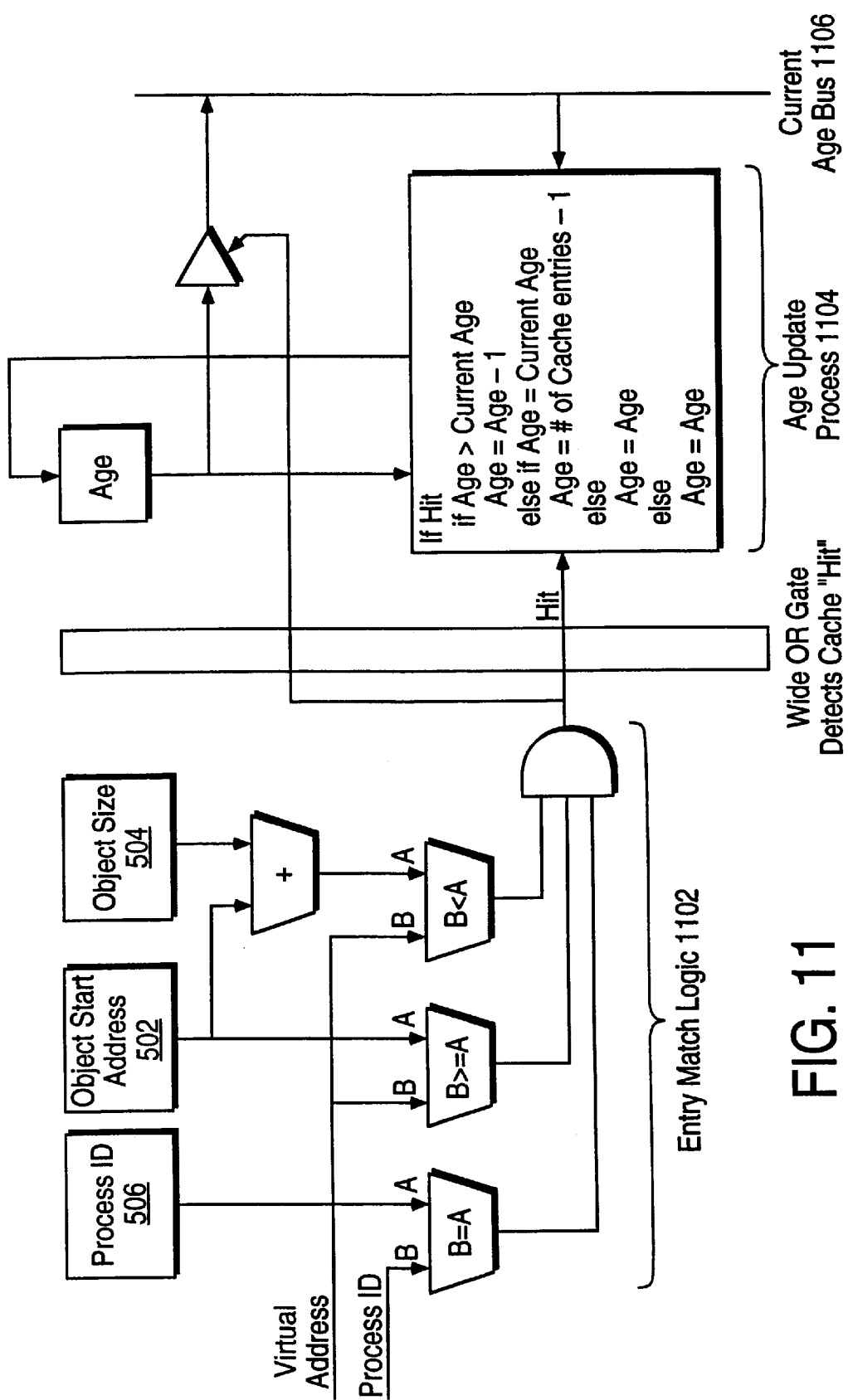
FIG. 11 is a block diagram of one embodiment of an aging process for a Least Recently Used (LRU) replacement algorithm.

Referring now to FIG. 11, there is shown a block diagram of one embodiment of a LRU cache replacement logic. The entry match logic compares 1102 the process ID and virtual address from the CPU with the values stored in the management table cache process ID, object start address 502 and object size 504. If there is a match a management table cache hit has occurred and the ages of the management table cache entries must be updated. The age process 1104 works as follows: The age of the management table cache entry for which the hit occurred is driven 1106 on the current age bus. The age of any entry with an age greater than the current age is decremented. The age of the management table cache entry for which the hit occurred is set to the number of management table cache entries minus one. The other age entries are unchanged. If a miss occurs (no hit occurred) the management table in system memory 314 is searched. If a match is found, the oldest entry in the management table cache 418 is replaced.

Figure 12:
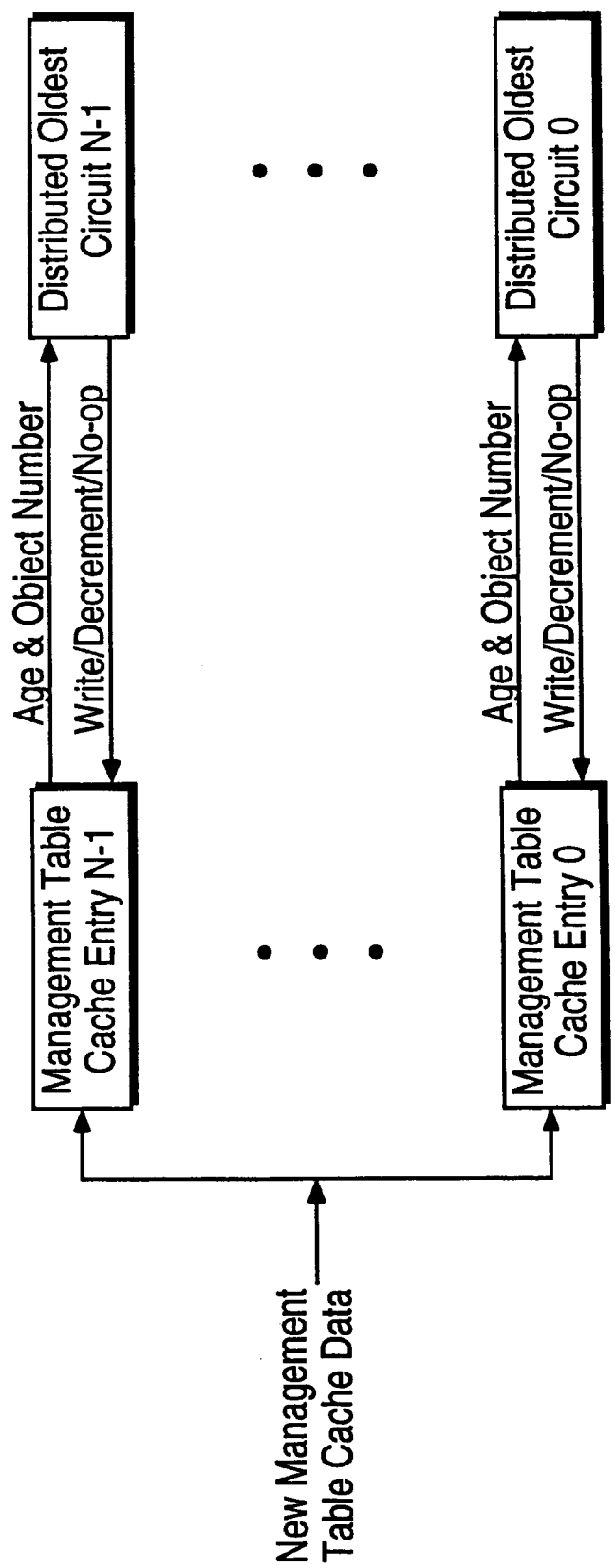
FIG. 12 is a block diagram of an LRU replacement algorithm implemented using a distributed implementation of an aging circuit.

Referring now to FIG. 12, there is shown an implementation of the age update process where the comparison of each management table cache entry's age is compared to the current age by duplicated compare circuits 1202. These circuits determine which entries ages should be decremented, which should stay the same (no operation or no-op) and which one should be loaded with the total number of management table entries minus one.

Figure 13:
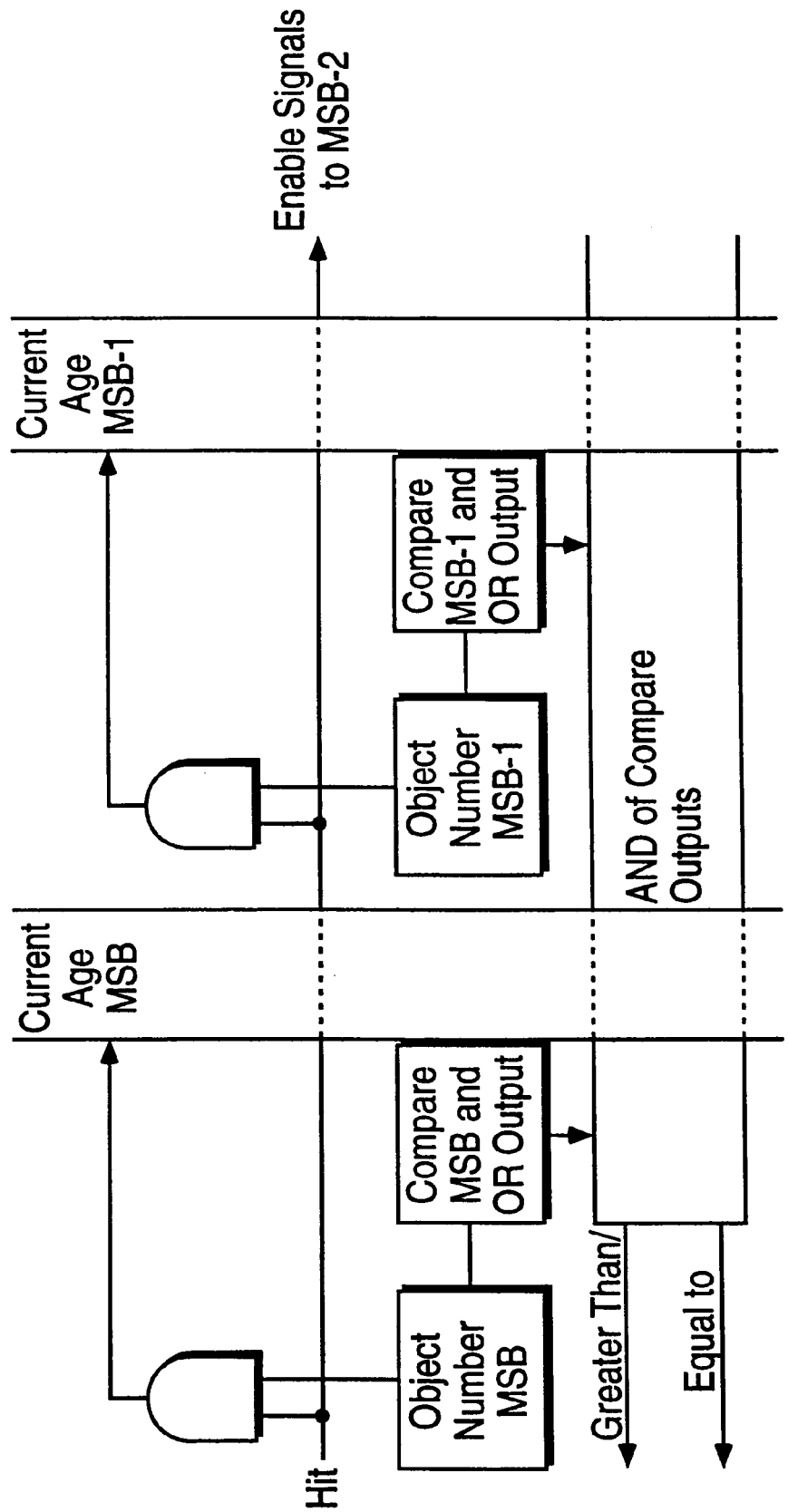
FIG. 13 is a block diagram of a single distributed oldest circuit.

Referring now to FIG. 13, there is shown a block diagram of implementation of a distributed compare circuit. The row with a hit drives the current age bus. All rows compute the greater than and equal to signals. These signals control which ages are decremented or loaded with the total number of management table entries minus one.

Figure 14:
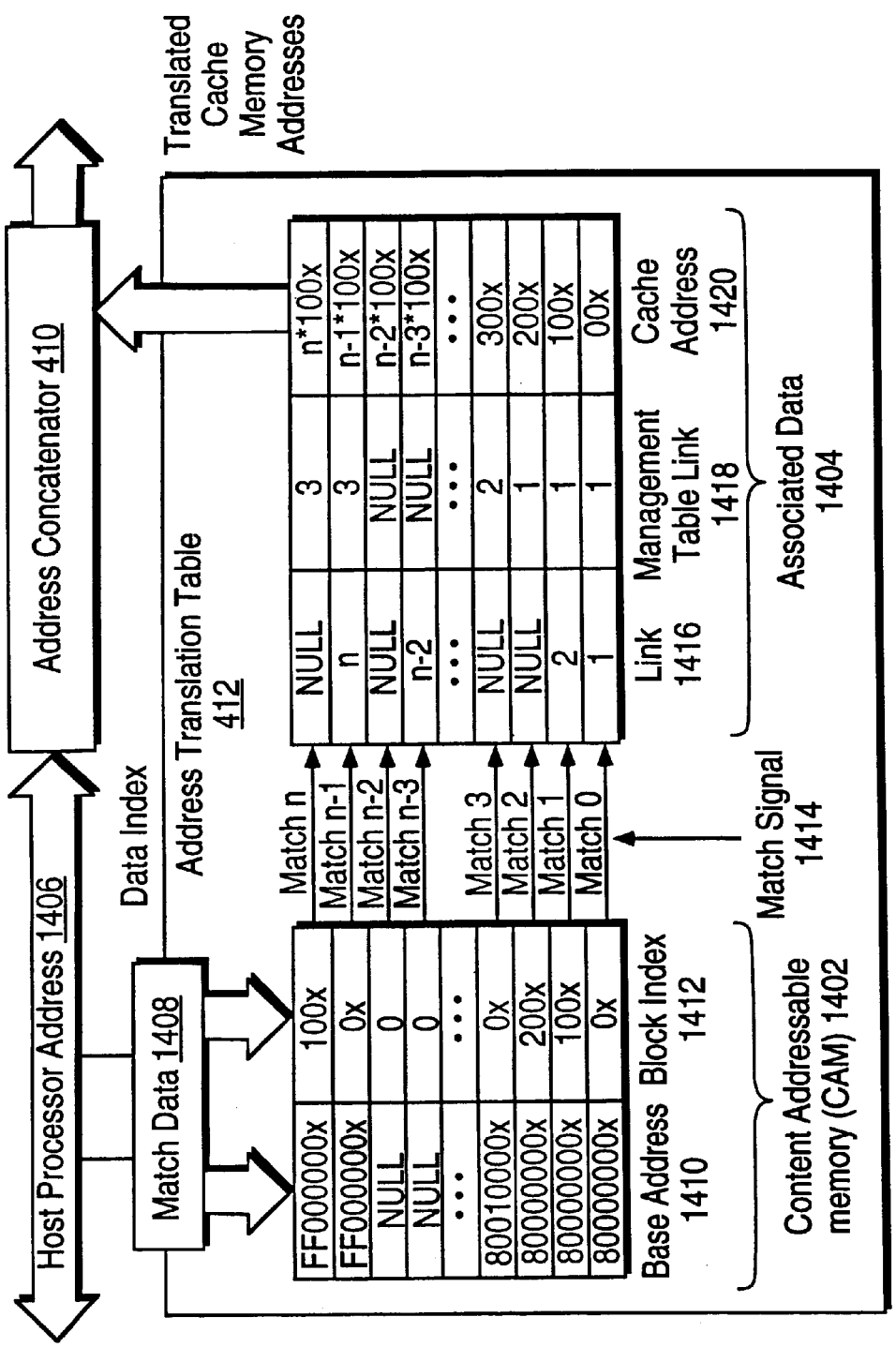
FIG. 14 is a functional block diagram of one embodiment of an address translation module 402.

Referring now to FIG. 14, there is shown a functional block diagram of one embodiment of an address translation module 402 block diagram. As discussed above with reference to FIG. 4, the address translation module 402 comprises an address concatenator 410 and an address translation table cache 412. As shown in FIG. 14, the address translation table cache 412 comprises a content addressable memory ("CAM") 1402 for enabling fast searches and associated data 1404 for providing entry specific information. One skilled in the art will realize that a CAM and associated data are not the only suitable devices for an address translation table but that any type of associative memory, which allows searches based on content as opposed to address location, may be used for the address translation table cache 412, and that the description here of a CAM and associated data are for illustrative purposes only.

The operation of the address translation module 402 is as follows. The host processor addresses 1406 are placed on the host processor address bus 1406 and are detected and used as input to the address translation module 402. In one embodiment, the DMC address range is a 32 bit address range with the high-order 26 bits being utilized for translation and the low-order 6 bits being passed on directly. The passed on 6 bits define a maximum segment offset size of 64 bytes. Match Data 1408, which in this embodiment is the high order 26 bits, is extracted from the host processor address 1406 and subdivided into two sections for searching the CAM: a base address 1410 and a block index 1412. If a search on the CAM results in a "miss" (i.e. match data is not located in CAM), then an address translation table cache entry must be loaded. Additionally, a new management table cache entry may also be required. When a search on the CAM 1402 using the Match Data 1408 results in a match, a corresponding match signal 1414 for the CAM entry is asserted for specifying a particular entry in the associated data 1404. Individual entries in the associated data 1404 that comprise a single memory element are linked together by a link field 1416. Unused entries are part of the address translation table cache free list. Active entries in the associated data 1404 also have a management table cache link 1418 for providing a link to the management table cache 418. Unused links are nullified. If a link field 1416 is NULL, signaling that this is the final segment of this memory element, the management table link is used to determine memory object size 504 in bytes. The valid byte length of the ending segment can be calculated by the modules of the object size 504 by the memory element size. The remainder of bytes in the last memory element will range from 1 to the memory element size. In one embodiment, only part of the addresses in this ending segment may be valid. If part of the addresses are invalid, an invalid address bus error is generated to alert the host processor. Translated cache addresses are stored in the mapped address field 1420. Translated cache addresses are determined during initialization and are treated as read-only data elements during operation of the present invention. The cache address 1420 associated with the match data 1408 search are then passed to the address concatenator 410. Thus, validated host processor addresses 1406 enable the mapped address to be concatenated with the pass through low-order 6 bits of the host processor address 1406 to form the translated cache memory address, thereby providing access to the memory object in the cache memory.

Figure 15:
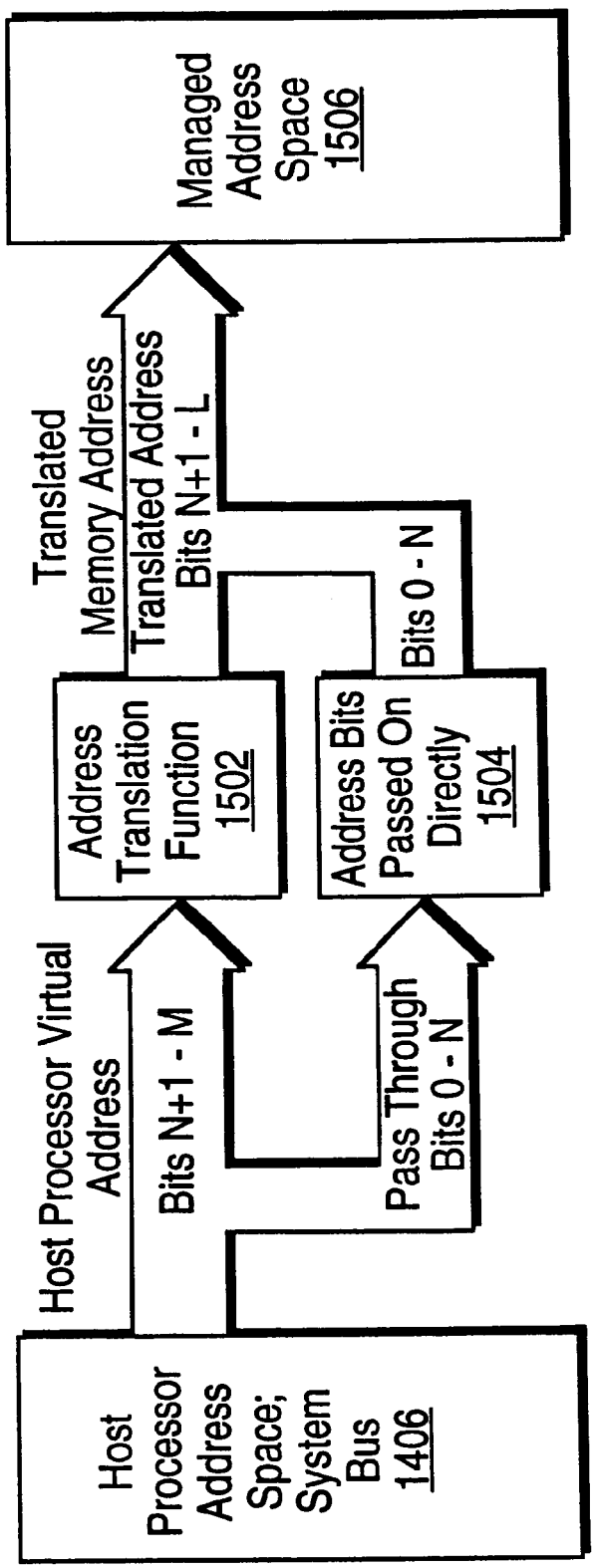
FIG. 15 is a block diagram of the address concatenator 410.

Referring now to FIG. 15, there is shown a block diagram of the address concatenator 410. As discussed above with reference to FIG. 14, the host processor address 1406 is placed on the system bus and used as an input to the address translation module 402. In general, bits N+1–M are used as the address bits for translation and are used to search the CAM 1402. The value N determines the size of an object cache line. For the example below, N is equal to 5. The value M is the width of the CPU address bus. For the example below, M is 32. In one embodiment, the high-order 26 bits are utilized for translation. Bits 0–N are passed on directly to the address concatenator 410. In one embodiment, the low-order 6 bits are the passed on bits. One skilled in the art will realize that the subdivision of the host processor address 1406 into bits used for translation and pass through bits is not limited to the examples provided here but may be subdivided as necessary or desired for utilization of the invention. For example, the low order 16 bits may be used for translation and the high order 16 bits may be used for passing through to the concatenator. The translated bits (Bits N+1–L) are then retrieved from the address translation table 412 as described with reference to FIG. 14 and concatenated with the pass through bits (Bits 0–N). The newly concatenated translated bits (Bits N+1–L) with the pass through bits (Bits 0–N) are then sent to the managed address space 1506.

Referring again to FIG. 14 and address translation table cache 412, there is shown an example of the linked segments that support three dynamically allocated memory object in the management table cache 418. From the example, management table cache entry 1 is added at the bottom of the address translation table cache 412. The base address field 1410 for this entry starts at 80000000 hexadecimal or $2^{31}$, and the block index field 1412 starts at 0 and increases by 100 hex (256 bytes). Following the management table link 1418 of 1, the management table memory allocate size field shows a memory object of 514 bytes. 514 bytes fits in three 256 byte segments that are connected by the link field 1416 with values of 1, 2, and NULL to end the list of segments. The translated cache memory address 0, 100, and 200 hex are the cache memory addresses 1420 for the 514 byte memory object. In one embodiment, the translated cache addresses are on 256 byte boundaries at offsets 0, 256, and 512 bytes respectively. Management table cache entry 2 is added above management table cache entry 1 in this example. For entry 2, the base address starts at 80010000 hex which is 65,536 bytes above the start address for management table cache entry 1. Thus, in this example, this sets the maximum individual memory object size of 65,536 bytes built from 256 address translation table entries.

Figure 16:
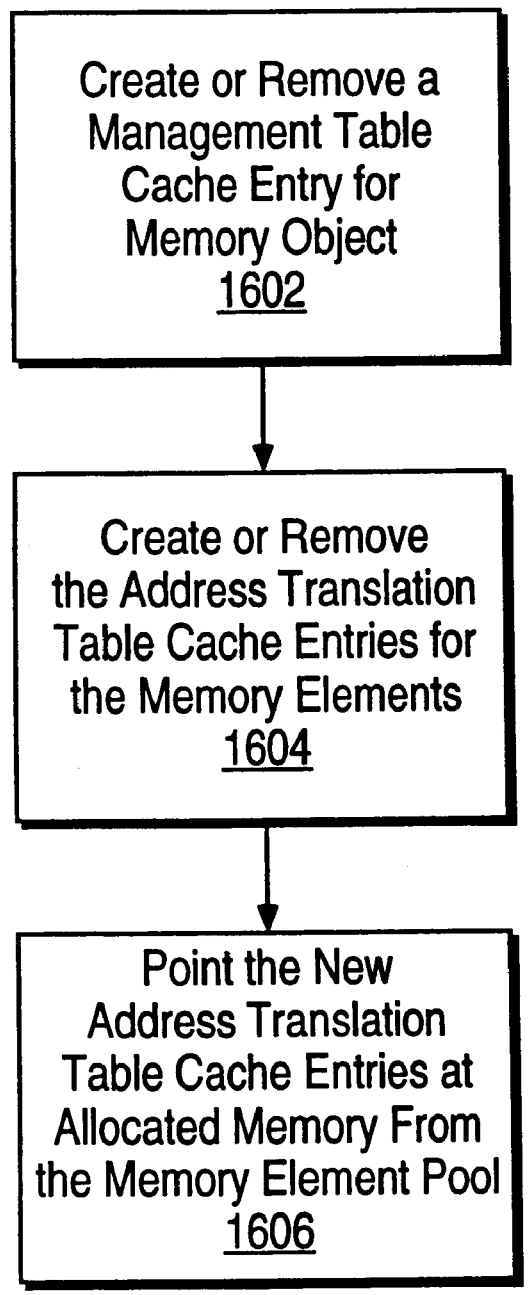
FIG. 16 is a flow chart of one embodiment for allocating and releasing a memory object in accordance with the present invention.

Referring now to FIG. 16, there is shown a flow chart of one embodiment for allocating and releasing a memory cache object in accordance with the present invention. A memory cache object is allocated by first creating or removing 1602 a management table cache entry for the object in the management table cache 418 for the currently executing process, program, or thread. Then, the address translation cache entries for the memory element in the address translation table are created or removed 1604 for the currently executing process, program, or thread. Finally, the new address translation table cache entries are pointed 1606 at the memory allocated from the memory element pool. Alternatively, the allocated memory may be returned to the memory element pool.

From the above description, it will be apparent that the invention disclosed herein provides a novel and advantageous method and system for dynamically allocating cached memory objects to a host processor. The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A system for caching at least one contiguous dynamically allocated variable size object mapped to a plurality of fixed size non-contiguous memory elements in physical memory, the system comprising:

an address translation table cache for caching at least one address translation table entry, the cached address translation entry associated with one of the plurality of memory elements, and for returning an object cache address for each cached memory element of the plurality of memory elements;

an object cache, coupled to the address translation table cache, for caching a subset of memory elements of the plurality of memory elements and for returning at least one memory element located at the object cache address; and a management table cache, coupled to the address translation table cache and to the object cache, for caching at least one management table entry, the management table entry associated with one of the plurality of memory elements, and for managing the cached memory elements in the object cache.

2. The system of claim 1, further comprising:

an address translation table for receiving a memory object address for each object and for translating the memory object address to an address of a fixed sized memory element in the physical memory.

3. The system of claim 2 wherein the address translation table is stored in physical memory.

4. The system of claim 2 wherein the address translation table is organized as an AVL tree.

5. The system of claim 2 wherein the address translation table is organized as a hash table.

6. The system of claim 2 wherein the address translation table is organized as a binary tree.

7. The system of claim 2 wherein the address translation table is organized as a sorted list.

8. The system of claim 1, further comprising a management table for managing memory elements in the physical memory.

9. The system of claim 8 wherein the management table is stored in physical memory.

10. The system of claim 8 wherein the management table is organized as an AVL tree.

11. The system of claim 8 wherein the management table is organized as a hash table.

12. The system of claim 8 wherein the management table is organized as a binary tree.

13. The system of claim 8 wherein the management table is organized as a sorted list.

14. The system of claim 1 wherein the management table cache is an associative memory cache.

15. The system of claim 1 wherein the address translation table cache is an associative memory cache.

16. The system of claim 1, further comprising a memory element table for storing a plurality of fixed size memory elements.

17. The system of claim 1, wherein the management table cache has a plurality of entries, each entry includes an object start address field indicating where the object starts in a logical address space.

18. The system of claim 1, wherein each entry in the management table cache includes a field indicating a size of the object in a logical address space.

19. The system of claim 1, wherein each entry in the management table cache includes an age and dirty flag field used to implement a LRU replacement algorithm.

20. The system of claim 1, wherein each entry in the management table cache includes an object number field providing an index to a management table.

21. The system of claim 1, wherein the subset of the plurality of memory elements includes most recently used memory elements.

22. The system of claim 1, wherein the subset of the plurality of memory elements includes most frequently used memory elements.

23. A system for caching at least one contiguous dynamically allocated variable size object mapped to a plurality of fixed size non-contiguous memory elements in physical memory, the system comprising:
   an object cache for caching a subset of memory elements of the plurality of memory elements and for returning at least one memory element; and
   a management module for managing the cached subset of memory elements in the object cache.

24. The system of claim 23, wherein the management module allocates the plurality of variable size dynamic objects and returns an object address for each allocated object of the plurality of objects, and the system further comprising:
   an address translation module, for receiving the object address and for translating the object address into an object cache address.

25. The system of claim 24, wherein the object address further comprises a plurality of address bits utilized for translation and pass-through bits not utilized for translation, and wherein the address translation module further comprises:
   an address translation table cache for receiving the plurality of address bits utilized for translation for each object and for translating the plurality of address bits utilized for translation to an object cache address; and
   an address concatenator coupled to receive the pass through bits not utilized for translation and to concatenate the pass-through bits with the object cache address to form a translated object cache address for the memory element.

26. The system of claim 25 wherein the address translation table cache comprises a CAM.

27. The system of claim 25, wherein the plurality of address bits utilized for translation further comprise a base address, and the address translation table cache further comprises:
   an associative memory element having a plurality of entries, each entry corresponding to at least one allocated object, each object having a base address indicating where the object starts in a logical address space and block index indicating an offset of the object; and
   associated data having a plurality of entries, each entry corresponding to the allocated object mapped to at least one memory element having an object cache address, the object cache address comprising a translation base and the block index.

28. The system of claim 27, wherein each entry in the associated data includes a field indicating a link to a management table cache entry.

29. The system of claim 27, wherein each entry in the associated data includes a field indicating a link between memory elements of the same object.

30. The system of claim 27, wherein each entry in the associated data includes an object-cache address for the memory element, the object cache address indicating where the memory element is stored in the object cache.

31. The system of claim 27, wherein the associative memory element functions like content addressable memory (CAM).

32. The method of claim 24, wherein the address translation module comprises a CAM.

33. The system of claim 24 wherein the object address further comprises a plurality of address bits utilized for translation and pass-through bits not utilized for translation, and wherein the system further comprises:
   an address translation table cache for receiving the plurality of bits utilized for translation for each object and for translating the plurality of address bits utilized for translation to an object cache address; and
   an address concatenator coupled to receive the pass through bits not utilized for translation and to concatenate the pass-through bits with the object cache address to form a translated object cache address.

34. The system of claim 23, wherein the management module further comprises:
   a control sequencer for receiving a set of host processor commands and for executing the set of host processor commands, each host processor command related to each variable size dynamic object;
   a management table cache, coupled to the object cache and accessible by the control sequencer, for caching at least one management table entry, the management table entry associated with one of the plurality of memory elements, and for managing the cached memory elements in the object cache; and
   a plurality of management registers for storing a set of parameters resulting from the execution of the set of host processor commands.

35. The system of claim 34 wherein the management table cache comprises a CAM.

36. The system of claim 23, wherein the subset of the plurality of memory elements includes most recently used memory elements.

37. The system of claim 23, wherein the subset of the plurality of memory elements includes most frequently used memory elements.

38. A method for caching at least one of a plurality of contiguous dynamically allocated variable size object, the method comprising:
   receiving a logical address for one of the plurality of objects, at least one object mapped to a plurality of fixed size non-contiguous memory elements in physical memory;

for each received logical address, determining whether one of the plurality of fixed size memory elements is cached; and responsive to one of the plurality of fixed size memory elements being cached:
   returning a translated object cache address for each cached memory element; and
   retrieving the memory element from the object cache, the memory element identified by the object cache address.

39. The method of claim 38 wherein the address for the memory object further comprises a plurality of translated bits and a plurality of pass through bits, and further comprising the steps of:
   determining an object cache address for the translated bits; and concatentating the object cache address with the pass through bits to form the translated object cache address.

40. The method of claim 38, further comprising the steps:
   responsive to the one of the plurality memory elements not being cached:
      for each object address, determining a physical address of one of the plurality of memory elements; and
      retrieving the memory element from an off-chip physical memory.

41. The method of claim 38, wherein the object address further comprises a plurality of address bits utilized for translation and pass-through address bits not utilized for translation, and wherein the step of determining whether one of the plurality of fixed size memory element is cached further comprises:
   determining whether the plurality of address bits utilized for translation match a base address field and a block index field in an associative memory element of an address translation table cache; and
   responsive to the address bits utilized for translation matching the base address field and the block index field:
      asserting a matching signal indicating that the fixed size memory element is cached;
      returning the object cache address for the memory element, the object cache address comprising a translation base and the block index; and
      retrieving the memory element, from the object cache, based on the object cache address.

42. The method of claim 41, further comprising:
   responsive to the address bits utilized for translation not matching the base address field and the block index field:
      determining whether a management table cache has an entry corresponding to the memory element.

43. The method of claim 42, further comprising:
   responsive to the management table cache having no entry corresponding to the memory element:
      updating the management table cache with a management table entry corresponding to the memory element;
      updating the address translation table cache with at least one address translation table entry corresponding to the memory element;
      updating the object cache with the memory element;
      translating the logical address to a physical address for the memory element; and
      retrieving the memory element from an off-chip memory element table, based on the physical address.

44. The system of claim 43, wherein the step of updating the object cache further comprises replacing at least one memory element stored in the object cache using a Least Frequently Used (LFU) replacement algorithm.

45. The system of claim 44, wherein the replacing step is performed using a write through caching.

46. The system of claim 44, wherein the replacing step is performed using a write back caching.

47. The system of claim 43, wherein the step of updating the object cache further comprises replacing at least one memory element stored in the object cache using a Least Recently Used (LRU) replacement algorithm.

48. The system of claim 47, wherein the replacing step is performed using a write through caching.

49. The system of claim 47, wherein the replacing step is performed using a write back caching.

50. The system of claim 43, wherein the step of updating the management table cache further comprises replacing at least one management table cache entry using a Least Frequently Used (LFU) replacement algorithm.

51. The system of claim 50, wherein the replacing step is performed using a write through caching.

52. The system of claim 50, wherein the replacing step is performed using a write back caching.

53. The system of claim 43, wherein the step of updating the management table cache further comprises replacing at least one management table cache entry using a Least Recently Used (LRU) replacement algorithm.

54. The system of claim 53, wherein the replacing step is performed using a write through caching.

55. The system of claim 53, wherein the replacing step is performed using a write back caching.

56. The method of claim 42, further comprising:
   responsive to the management table cache having the entry corresponding to the memory element:
      updating the address translation table cache with at least one address translation table entry corresponding to the memory element;
      translating the logical address to a physical address for the memory element; and
      retrieving the memory element from an off-chip memory element table, based on the physical address.

57. The system of claim 56, wherein the step of updating the address translation table cache further comprises replacing at least one address translation cache entry using a Least Recently Used (LRU) replacement algorithm.

58. The system of claim 57, wherein the replacing step is performed using a write through caching.

59. The system of claim 57, wherein the replacing step is performed using a write back caching.

60. The system of claim 56, wherein the step of updating the address translation table cache further comprises replacing at least one address translation cache entry using a Least Frequently Used (LFU) replacement algorithm.

* * * * *